April 6, 1943. C. P. WARD 2,315,680
SHELTER ATTACHMENT FOR MOTOR VEHICLES
Filed Oct. 8, 1941 2 Sheets-Sheet 1
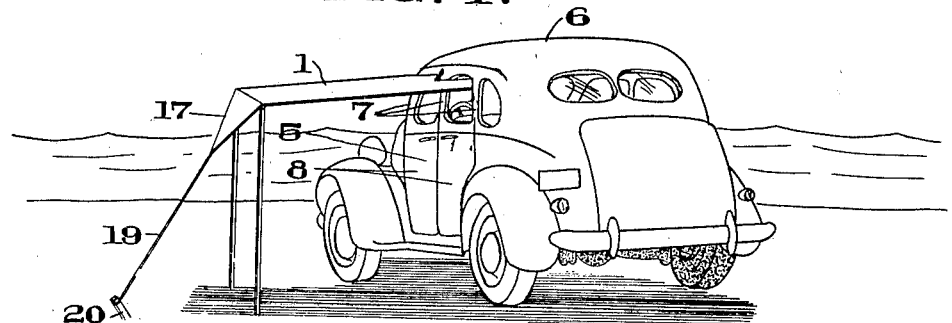
FIG. 1.
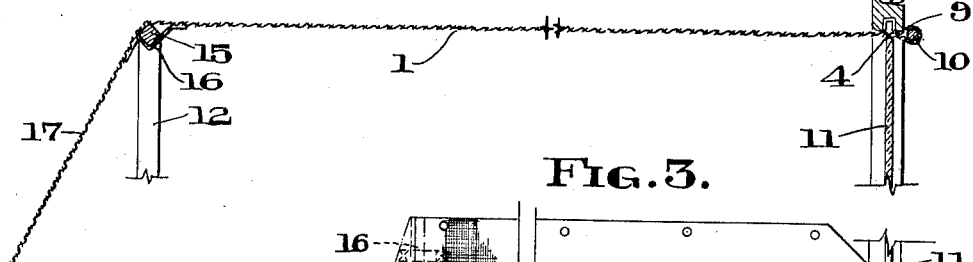
FIG. 2.
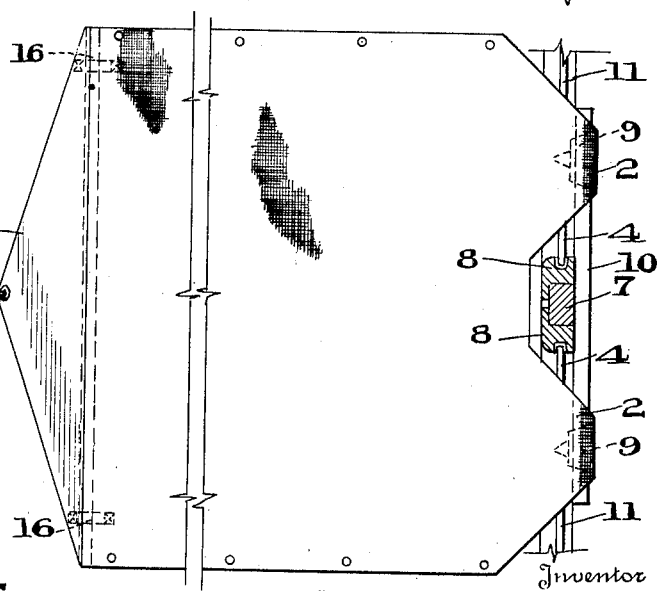
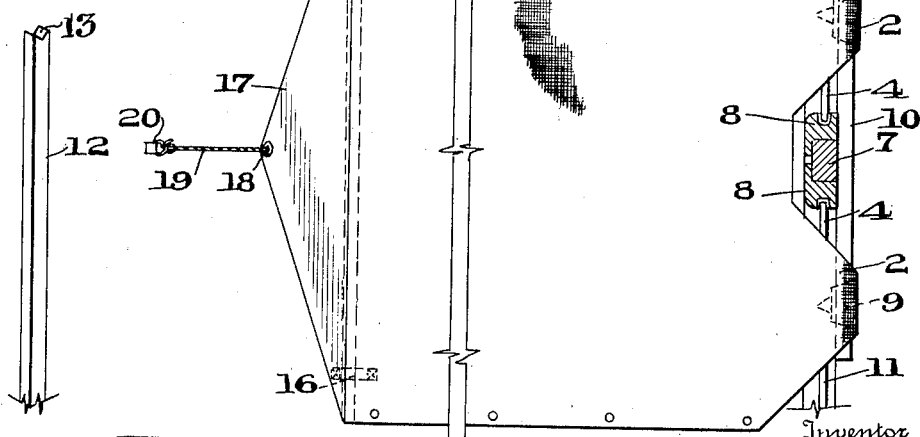
FIG. 3.
FIG. 4.
FIG. 5.
Inventor
Carroll Pratt Ward
By W. S. McDowell
Attorney April 6, 1943.  C. P. WARD  2,315,680
SHELTER ATTACHMENT FOR MOTOR VEHICLES
Filed Oct. 8, 1941  2 Sheets-Sheet 2
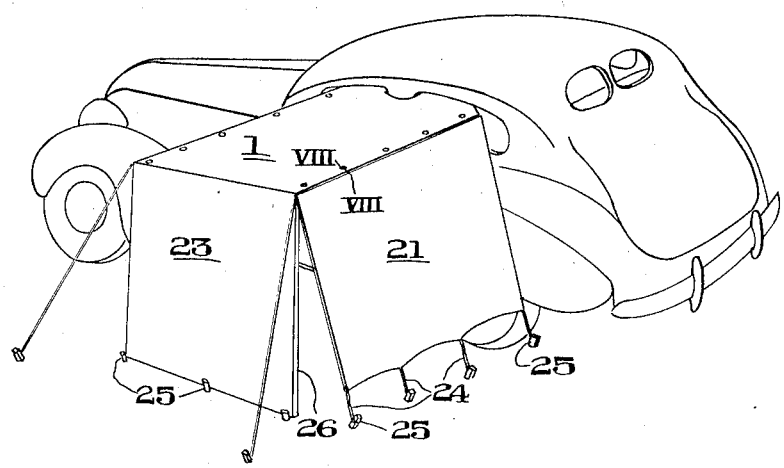
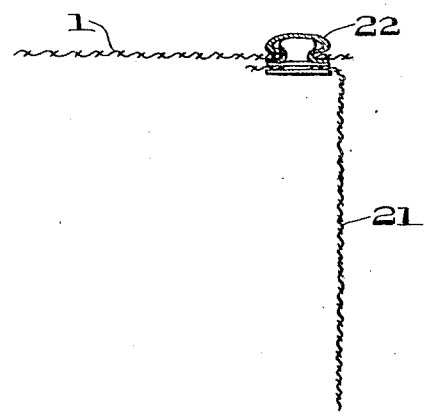
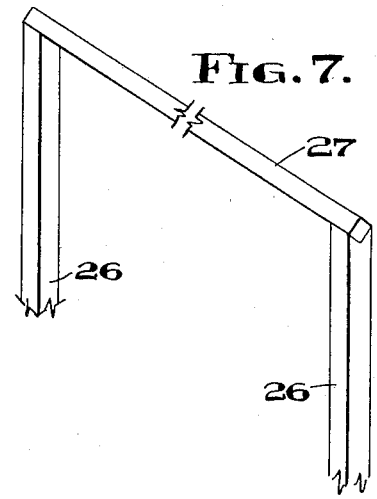
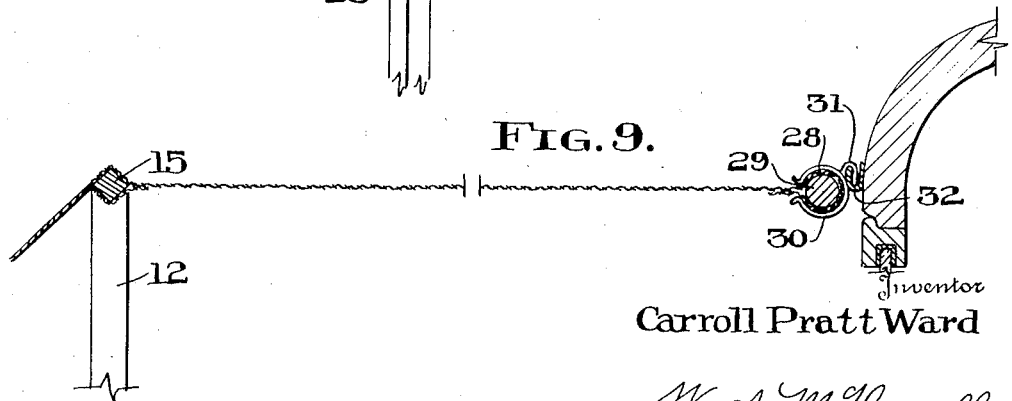
Inventor
Carroll Pratt Ward
By W. S. McDowell
Attorney Patented Apr. 6, 1943

2,315,680

UNITED STATES PATENT OFFICE 2,315,680

SHELTER ATTACHMENT FOR MOTOR VEHICLES

Carroll Pratt Ward, Galveston, Tex.

Application October 8, 1941, Serial No. 414,099

6 Claims. (Cl. 135—5)

This invention relates to an improved shelter attachment for motor vehicles.

Motorists frequently find it advantageous to erect at the sides of their machines a tent, awning or other covering, usually termed shelters, for use in obtaining protection from the elements. Such shelters offer protection from the sun or wind and contribute materially to the comfort of motorists on picnics, beach parties, fishing trips and other outdoor activities where shade and shelter are needed.

Shelters hitherto developed for such purposes have involved relatively costly and structurally complicated designs, possessing unnecessary bulk and weight, presenting difficulties in their erection or installation and, also, in compactly folding the same for minimum storage space requirements during transportation.

Accordingly, the present invention has for its objects, among others, the provision of a compact, lightweight shelter so designed that it may be quickly and securely joined with the side of a motor vehicle to provide a tent or awning which affords a sheltered area for the vehicle occupants; the provision of a shelter of the type set forth wherein the fabric top thereof has its inner end bifurcated to produce spaced extensions which are adapted to project through the door or window openings of a motor vehicle body, the inner edges of such extensions being looped or hemmed for the removable reception of a cooperative holding rod, the latter when inserted in said loops or hems engaging with a frame post, or other stationary inner part of the associated motor vehicle body, so that the shelter top may be drawn taut and maintained in its active positions; and in the provision of a shelter of lightweight inexpensive construction, one which may be folded compactly, readily erected and otherwise well adapted in the performance of its intended functions.

With these and other objects in view, as will appear as the description proceeds, the invention consists in the novel features of construction, combinations of elements and arrangements of parts, hereinafter more fully described and pointed out in the appended claims.

In the accompanying drawings:

Fig. 1 is a perspective view of a motor vehicle equipped with the shelter attachment comprising the present invention;

Fig. 2 is a detail vertical sectional view taken through the shelter and illustrating its connection with the automobile body;

Fig. 3 is a horizontal sectional view taken through the upper portion of an automobile body and illustrating the shelter attachment in plan;

Fig. 4 is a detail perspective view of the upper end of the ground-inserted post;

Fig. 5 is a bottom plan view of the horizontal member associated with said post and used in the support of the outer portions of the shelter;

Fig. 6 is a perspective view showing a modified form of shelter;

Fig. 7 is a perspective view of the supporting post structure employed in the form of the shelter disclosed in Fig. 6;

Fig. 8 is a detail transverse sectional view on the line VIII—VIII of Fig. 6.

Fig. 9 is a detail vertical sectional view taken through a further modified form of shelter which utilizes a different method of attachment to the automobile body.

In the form of the invention disclosed in Figs. 1 to 5 inclusive, the improved shelter comprises a fabric top member 1, which may be formed from canvas, duck, rubberized fabrics or other suitable lightweight flexible materials such as a pliable paper. Generally, the top member is of rectangular formation, possessing suitable dimensions for the uses and purposes set forth. The inner edge portions of the covering 1 are bifurcated as shown in Fig. 3, to provide spaced reduced extensions 2. These extensions are spaced so that the same will project or extend into the door or window openings 3 and 4 respectively of a motor vehicle body 5, the latter being formed to include the usual top 6, stationary frame posts 7 and hinged doors 8. The inner edges of the extensions 2 are looped or hemmed as at 9 for the removable reception of a holding rod 10, the latter engaging with the inner surfaces of the frame post 7 and the doors 8, as shown in Fig. 3, and held in frictional engagement therewith when the top member 1 is under tension.

By the use of this construction, the shelter may be quickly attached to the side of a motor vehicle by passing the extensions 2 over the upper edges of the transparent window panels 11, and slidably passing the rod 10 through the looped ends of said extensions. By elevating the panels, as shown in Fig. 2, their upper edges may be brought into clamping engagement with the top member in front of the rod 10, thus holding the rod against displacement and enabling the necessary tensioning forces to be applied to the top member. The fabric top is thus anchored in connection with the motor vehicle so that it may be drawn tautly in an outward direction. The outer end of the fabric top may then be supported by means of ground-engaging posts 12. These posts have their upper ends formed with notches 13 to receive the ends of a cross bar 15. The cross bar may be received within tapes 16 secured to the under side of a fabric top 1. The lower ends of the posts 12 may then be driven into the ground to a suitable depth to preserve their stability. The extreme outer end of the top terminates in a triangular extension 17, in the apex of which is formed an eyelet 18. A cable 19 may be trained through this eyelet and connected at its free end with a ground-inserted peg 20. By tensioning the cable 19 around the peg 20, the shelter may be supported in its required operative position.

In view of the foregoing, it will be seen that a shelter attachment for motor vehicles is provided which is extremely simple in construction and capable of being quickly and readily set up to occupy its active position. If desired, the inner extensions 2 of the top 1 may project through the door openings 3 rather than through the window openings 4. By this method of application, the doors of the vehicle may be opened independently of the shelter. In the event more complete protection is desired than with the use of the open type shelter shown in Fig. 1, the top of the shelter, as illustrated in Fig. 6, may be provided with associated side sections 21. These sections may be removably attached to the side edges of the top 1 by means of separable snap fasteners of the type disclosed at 22 in Fig. 8. Also, the front of the shelter may include a complete drop section 23 of the nature set forth in Fig. 6. The lower edges of the sections 21 and 23 may be joined by means of cables 24 with the ground pegs 25. In this form of the invention, also, a pair of ground posts 26 are used at the outer end of the shelter, as illustrated in Fig. 7. The upper ends of the post 26 are notched to removably receive the cross rail 27.

In the form of the invention illustrated in Fig. 9, the end of the shelter nearest the vehicle is provided with a casing 28 which may be formed by turning the edge of the top under and stitching it to the body. The casing 28 receives a pole 29 and a plurality of spring loops 30 are positioned at spaced intervals along the pole. These loops have hooks 31 formed thereon which are adapted to be positioned in the drip rail 32 secured to the outer side of the vehicle body immediately above the doors and windows. The outer end of the shelter top is also formed with a casing to receive the pole 15 and one or more ropes are attached to this end of the shelter for fastening it to stakes driven into the ground as in the form of shelter first described. Uprights 12 hold the pole 15 in an elevated position substantially in horizontal registration with the pole fixed to the vehicle. When tension is applied to the outer end of the top through the medium of the ropes secured thereto, the shelter top will be stretched taut and held against vertical movement.

The use of the drip rail 32 for supporting one end of the shelter is desirable because it permits swinging movement of the vehicle doors without interference. The windows may also be raised or lowered without affecting the vertical position of the shelter.

What is claimed is:

1. A shelter attachment for motor vehicles comprising a flexible top section, spaced extensions projecting inwardly from the inner portions of said top section, a fastening rod removably engaged with the inner portions of said extensions and with inner stationary parts of the associated motor vehicle body, and ground-engaging supporting and securing devices cooperative with the outer portions of said top section.

2. A shelter attachment for motor vehicles comprising a fabric top section, spaced securing extensions formed with the inner end of said top section, the spacing of said extensions being such as to enable the same to project through the window and door openings of an associated motor vehicle body, a fastening rod removably joined with the inner ends of said extensions within the interior of the vehicle body, said rod having its intermediate portions engaged with stationary parts of the vehicle body, and means cooperative with the outer end of said top section for supporting and maintaining the same in a substantially horizontal position.

3. A shelter attachment for motor vehicles comprising a fabric top section, spaced securing extensions formed with the inner end of said top section, the spacing of said extensions being such as to enable the same to project through the window and door openings of an associated motor vehicle body, a fastening rod removably joined with the inner ends of said extensions within the interior of the vehicle body, said rod having its intermediate portions engaged wth stationary parts of the vehicle body, means cooperative with the outer end of said top section for supporting and maintaining the same in a substantially horizontal position, and side sections removably connected with said top section.

4. A shelter attachment for motor vehicles comprising a fabric top section adapted to extend horizontally from the side of an associated motor vehicle body, said section having the portions thereof disposed adjacent to the vehicle body bifurcated to form spaced securing extensions, the spacing of said extensions being such as to enable the same to project through a pair of adjacent door and window openings provided in the side of the motor vehicle body, a removable rod having the end portions thereof received within loops provided in the inner ends of said extensions, the intermediate portions of said rod being engageable with a stationary post of the vehicle body positioned between the adjacent door and window openings, and means connected with the outer end portions of said top section and engaged with the ground for maintaining said top section in a taut horizontal position.

5. A shelter attachment for motor vehicles comprising a substantially rectangular top section, rods provided at opposite edges of said top section, means carried by one of said rods for connecting the same to a portion of a vehicle body, ground engaging means for supporting the other rod in horizontal registration with the first rod, and means for applying tensioning forces to said top to maintain it in operative positions.

6. A shelter attachment for motor vehicles comprising a substantially rectangular fabric top section, rod-receiving means provided at the opposite transverse edges of said top section, a rod removably positioned in the innermost of said means and adapted for connection with the side of a motor vehicle body, a second rod positioned in the outermost of said means, post devices for maintaining said second-named rod in a desired position of vertical elevation, and means for applying tensioning forces to said top section and said post devices to maintain the same in erected and operative positions.

CARROLL PRATT WARD.